Patented Dec. 5, 1939

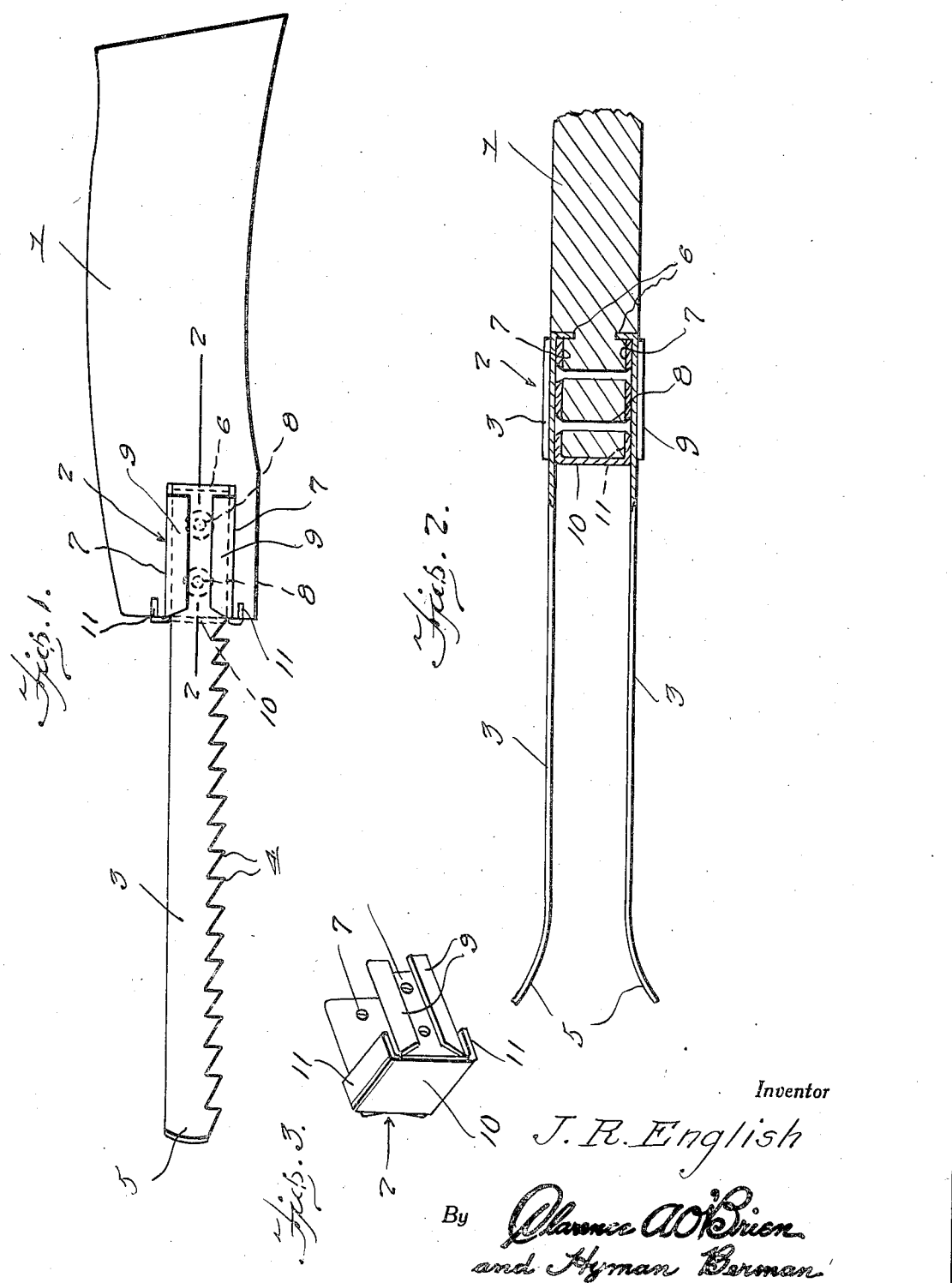

2,182,117

UNITED STATES PATENT OFFICE 2,182,117

CANE STRIPPER

Jesse Riley English, Gibsland, La.

Application April 30, 1938, Serial No. 205,325

2 Claims. (Cl. 130—31)

The present invention relates to new and useful improvements in cane strippers and has for its primary object to provide, in a manner as hereinafter set forth, a device of this character embodying a novel construction and arrangement of spaced knives adapted to straddle a stalk for removing the leaves therefrom in an expeditious and generally satisfactory manner.

Another very important object of the invention is to provide a cane stripper of the aforementioned character embodying novel means for securing the blades or knives to the handle of the tool.

Other objects of the invention are to provide a cane stripper of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a cane stripper constructed in accordance with the present invention.

Figure 2 is a fragmentary view principally in horizontal section, taken substantially on the line 2—2 of Fig. 1.

Figure 3 is a detail view in perspective of the blade holder.

Referring now to the drawing in detail, it will be seen that the embodiment of the invention which has been illustrated comprises a handle 1 of suitable material, preferably wood. Mounted on one end portion of the handle 1 is a metallic blade holder which is designated generally by the reference numeral 2. Mounted on the holder 2 is a pair of spaced, resilient blades 3 of suitable metal the cutting edges of said blades being toothed as at 4. The blades 3 are adapted to receive the stalks to be stripped therebetween. The blades 3 terminate in outturned free end portions 5 to facilitate the passage of the stalks therebetween. At their inner ends the blades 3 terminate in inturned flanges 6 which are embedded in the sides of the handle 1.

As illustrated to advantage in Fig 3 of the drawing, the blade holder 2 is substantially U-shaped and comprises legs 7 which straddle the handle 1, said legs being recessed in the sides of said handle and positively secured thereto through the medium of rivets 8 or the like. As seen in Fig. 2 of the drawing the inturned flanges 6 on the blades 3 are engaged with the rear ends of the legs 7.

The longitudinal edges of the legs 7 of the holder 2 are provided with flanges 9 in which the rear end portions of the blades 3 are secured. The bight portion 10 of the substantially U-shaped blade holder 2 is provided with flanges 11 which are embedded in the forward end of the handle 1.

It is thought that the manner of using the tool will be readily apparent from a consideration of the foregoing. Holding the device by the handle 1, the blades 3 are caused to straddle the stalk and the leaves may then be expeditiously stripped from said stalk in an obvious manner. The resilient blades 3 are adapted to spread to accommodate different sizes of stalks and to meet various conditions. The construction of the holder 2 is such that the resilient blades 3 are securely attached to the handle 1. By bending the retaining flanges 9 outwardly the blades 3 may be removed from the handle 1 and replaced when desired.

It is believed that the many advantages of a cane stripper constructed in accordance with the present invention will be readily understood and although a preferred embodiment of the device is as illustrated and described it is to be understood that changes in the details of construction and in the combination and arrangement of parts may be resorted to which will fall within the scope of the invention as claimed.

What is claimed is:

1. A cane stripper comprising a handle, a substantially U-shaped holder mounted on one end portion of said handle, and a pair of blades mounted on the holder, said holder including a bight portion engaged with one end of the handle, said holder further including legs straddling the handle and secured thereto, flanges on the bight portion of the holder embedded in said one end of the handle, and means for securing the blades to the legs of the holder, said means including flanges on the longitudinal edges of the legs engaged with the blades, said blades including inturned flanges on their inner ends embedded in the handle and engaged with the free ends of the legs of the holder.

2. A cane stripper of the class described comprising a handle, a holder on one end portion of said handle, a pair of spaced, resilient, toothed blades mounted on said holder, said blades terminating in outturned free end portions, the blades further including inturned flanges on their inner ends embedded in the sides of the handle, the holder being substantially U-shaped and including a bight portion engaged with one end of the handle and further including spaced legs straddling the handle and recessed in and secured thereto, the free ends of said legs being engaged with the flanges, the holder further including flanges on the bight portion thereof embedded in said one end of the handle, and flanges on the longitudinal edges of the legs engaged with the rear end portions of the blades for securing said blades to said legs.

JESSE RILEY ENGLISH.